(12) United States Patent
Goel et al.

(10) Patent No.: US 10,579,424 B2
(45) Date of Patent: Mar. 3, 2020

(54) PRIORITIZATION IN A PERMISSIONED BLOCKCHAIN

(71) Applicant: International Business Machines Corporation, Armonk, NY (US)

(72) Inventors: Seep Goel, New Delhi (IN); Abhishek Singh, New Delhi (IN); Rachit Garg, Faridabad (IN); Mudit Verma, New Delhi (IN); Praveen Jayachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 15/980,432

(22) Filed: May 15, 2018

(65) Prior Publication Data
US 2019/0354397 A1 Nov. 21, 2019

(51) Int. Cl.
*G06F 9/48* (2006.01)
*G06F 16/18* (2019.01)

(52) U.S. Cl.
CPC ........ *G06F 9/4881* (2013.01); *H04L 2209/00* (2013.01)

(58) Field of Classification Search
CPC ............. H04L 2209/38; H04L 2209/56; H04L 67/104; G06F 16/1834
See application file for complete search history.

(56) References Cited

U.S. PATENT DOCUMENTS

| | | | |
|---|---|---|---|
| 2016/0342977 A1 | 11/2016 | Lam | |
| 2017/0132626 A1* | 5/2017 | Kennedy | G06Q 20/065 |
| 2017/0236121 A1 | 8/2017 | Lyons et al. | |
| 2017/0237570 A1* | 8/2017 | Vandervort | H04L 63/0442 |
| | | | 713/176 |
| 2017/0243177 A1* | 8/2017 | Johnsrud | G06Q 20/389 |
| 2017/0250972 A1* | 8/2017 | Ronda | H04L 9/08 |
| 2017/0285720 A1 | 10/2017 | Shah | |
| 2017/0301033 A1 | 10/2017 | Brown et al. | |
| 2018/0089641 A1* | 3/2018 | Chan | G06Q 20/0655 |
| 2018/0109541 A1* | 4/2018 | Gleichauf | H04L 63/123 |
| 2018/0240114 A1* | 8/2018 | Li | G06Q 10/00 |
| 2018/0276668 A1* | 9/2018 | Li | G06Q 20/38215 |
| 2019/0012662 A1* | 1/2019 | Krellenstein | G06Q 20/3827 |
| 2019/0042407 A1* | 2/2019 | Gao | G06F 3/0619 |
| 2019/0104196 A1* | 4/2019 | Li | G06F 16/2379 |

(Continued)

OTHER PUBLICATIONS

A. Ellervee, "A Reference Model for Blockchain-Based." Distributed Ledger Technology, Masters' Thesis, University of Tartu, Institute of Computer Science, Software Engineering Curriculum, 2017.

(Continued)

*Primary Examiner* — Dong U Kim

(57) ABSTRACT

An example operation may include one or more of identifying a blockchain transaction requiring peer endorsement, transmitting a request for endorsement to one or more peers assigned to a blockchain, receiving endorsement response messages from the one or more peers, wherein the endorsement response messages comprise a plurality of priorities assigned to the blockchain transaction, and forwarding the received plurality of priorities and the blockchain transaction to an ordering node for assignment to the peers.

20 Claims, 11 Drawing Sheets

(56) References Cited

U.S. PATENT DOCUMENTS

2019/0305938 A1* 10/2019 Sandberg-Maitland ..................... H04L 9/0822

OTHER PUBLICATIONS

Alqassem, "Towards Reference Architecture for Cryptocurrencies: Bitcoin Architectural Analysis," 2014 IEEE International Conference on Internet of Things (iThings), and IEEE Green Computing and Communications (GreenCom) and IEEE Cyber, Physical and Social Computing (CPSCom), Taipei, 2014, pp. 436-443.
Dai, "Smart-Contract Value-Transfer Protocols on a Distributed Mobile Application Platform." Whitepaper, 2017 https://www.researchgate.net/publication/314190216_Smart-Contract_Value-Transfer_Protocols_on_a_Distributed_Mobile_Application_Platform, https://qtum.org/uploads/files/a2772efe4dc8ed1100319c6480195fb1.pdf.
K. Baqer, "Stressing Out: Bitcoin Stress Testing." Financial Cryptography Workshops. LNCS, vol. 9604, pp. 3-18. Springer, 2016.
P. Jayachandran, "Making Blockchain Real for Business." PPT slide presentation for Blockchain 2017: Workshop on Blockchain Technologies, Nov. 29-Dec. 1, 2017. Indian Statistical Institute, Kolkata. Venue: NAB-1 Seminar Hall, Ground Floor, Kolmogorov Building.
R. Bieliauskas, "Bitcoin—a way to reach consensus in a completely decentralized manner." Lietuvos matematikos rinkinys. Proc. of the Lithuanian Mathematical Society, Ser. A ,vol. 57, 2016.
S. Kasahara, "Effect of Bitcoin fee on transaction-confirmation process." (Submitted on Apr. 1, 2016 (v1), last revised May 30, 2017 (this version, v3)), https://arxiv.org/abs/1604.00103.

* cited by examiner

PRIORITIZATION IN A PERMISSIONED BLOCKCHAIN

TECHNICAL FIELD

This application generally relates to a permissioned blockchain, and more specifically to prioritization in a permissioned blockchain.

BACKGROUND

A blockchain may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in a blockchain's blocks, which are secured from tampering and revision due to their immutable properties. Each block contains a timestamp and a link to a previous block. Blockchain can be used to hold, track, transfer and verify information. Since blockchain is a distributed system, before adding a transaction to a blockchain ledger, all peers need to reach a consensus status.

Conventionally, prioritization is used in many types of networks as not all "requests to be processed" and "data to be stored" have equal importance. Priority needs to be determined and enforced in a decentralized manner. Directly applying existing techniques can degenerate a blockchain network into a centrally controlled system. Permissioned blockchain networks are complex distributed systems with multiple interacting heterogeneous processes/components, such as transaction execution, consensus, ledger validation and commitment phases. The enforcement efforts needs to enforce priority at multiple stages of a transaction's processing, as enforcing priority in one component may not translate into a differentiated service. Currently all the requests related to blockchain transactions are processed with equal importance, more specifically in a sequential manner with a fixed order. However, there are scenarios where fast tracking or slowing down the transactions in a blockchain would be beneficial. Critical transactions may require precedence over normal transactions (e.g., financial, healthcare, etc.). System transactions may require precedence over client transactions. Write transactions that changes the state of the system may require precedence over the query (read) transactions.

Permissionless blockchain systems have a natural approach to achieving prioritization using transaction fees/cryptocurrency. For example, a higher fee paid for a transaction enables blockchain miners to have a greater incentive to add that transaction to a block, and the transaction will be executed faster than other transactions. A transaction could get postponed for an indefinite time when it's passed over for higher rewarded transactions. This approach is impractical in permissioned blockchain networks, that aim to guarantee transaction execution once submitted.

SUMMARY

One example embodiment may provide a method that includes one or more of identifying a blockchain transaction requiring peer endorsement, transmitting a request for endorsement to one or more peers assigned to a blockchain, receiving endorsement response messages from the one or more peers, wherein the endorsement response messages comprise a plurality of priorities assigned to the blockchain transaction, and forwarding the received plurality of priorities and the blockchain transaction to an ordering node for assignment to the peers.

Another example embodiment may include an apparatus that includes a processor configured to perform one or more of identify a blockchain transaction that requires peer endorsement, a transmitter configured to transmit a request for endorsement to one or more peers assigned to a blockchain, a receiver configured to receive endorsement response messages from the one or more peers, and where the endorsement response messages comprise a plurality of priorities assigned to the blockchain transaction, and the transmitter is further configured to forward the received plurality of priorities and the blockchain transaction to an ordering node for assignment to the peers.

Another example embodiment may include a non-transitory computer readable storage medium configured to store instructions that when executed cause a processor to perform one or more of identifying a blockchain transaction requiring peer endorsement, transmitting a request for endorsement to one or more peers assigned to a blockchain, receiving endorsement response messages from the one or more peers, and the endorsement response messages include a plurality of priorities assigned to the blockchain transaction, and forwarding the received plurality of priorities and the blockchain transaction to an ordering node for assignment to the peers.

DETAILED DESCRIPTION

Figure 1A:
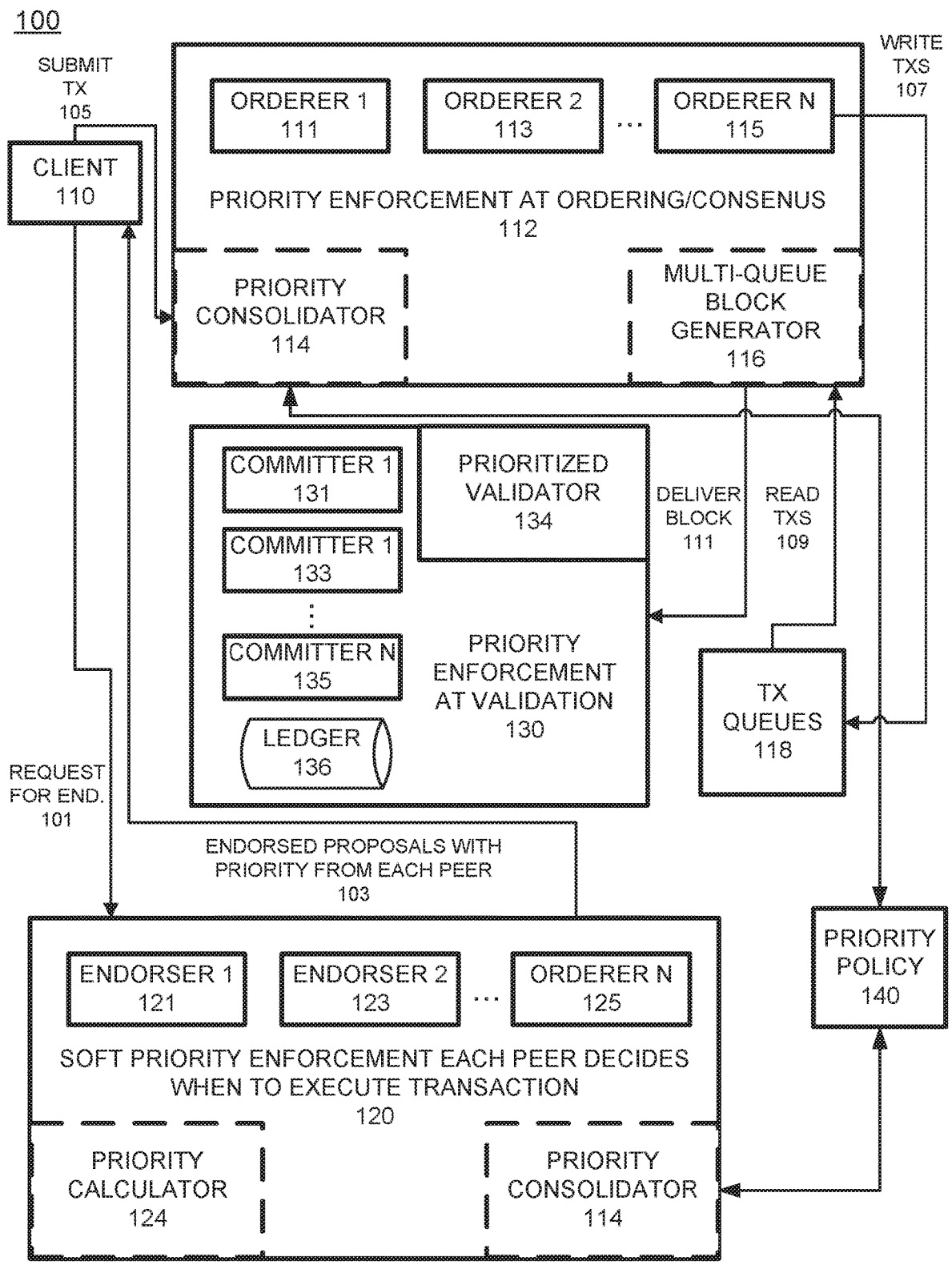
FIG. 1A illustrates a logic network diagram of blockchain transaction priority assignment, according to example embodiments.

It will be readily understood that the instant components, as generally described and illustrated in the figures herein, may be arranged and designed in a wide variety of different configurations. Thus, the detailed description of the embodiments of a method, an apparatus, a non-transitory computer readable medium and a system, as represented in the associated figures and description, is not intended to limit the scope of the application, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of messages or network data, such as, packet, frame, datagram, etc. Furthermore, while certain types of messages, signaling and protocols may be depicted in exemplary embodiments they are not limited to a certain type of message, signaling or protocol.

Example embodiments provide methods, devices, networks and/or systems, which support a blockchain distributed system with selective peer management procedures. A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockhcain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Example embodiments provide a method, device, system and computer platform for blockchain peers to assign priorities to pending blockchain transactions in a decentralized manner, and for the priorities to be enforced at different stages of transaction processing within the blockchain network. The assigned priorities provided by each peer can be based on static rules and/or dynamic system rules contingent on other network elements. Such assigned priorities are consolidated into a single 'final' priority to be assigned and used to manage the transaction based on a priority consolidation policy. Such a consolidated policy is enforced during ordering/consensus of a transaction, as well as transaction validation prior to blockchain transaction commitment. Enforcement during the ordering process permits the ordering service of the ordering/orderer node to select transactions from various available priorities based on a priority-aware block formation policy. Such a priority-aware block formation policy ensures that different peers read the same set of transactions from multiple different priority queues while forming a block. The assignment of priorities can also be audited at a later point in time as they are being persisted as a part of transactions on the blockchain.

The instant application in one embodiment relates to a permissioned blockchain, and in another embodiment relates to prioritization in a permissioned blockchain.

FIG. 1A illustrates a logic network diagram of blockchain transaction priority assignment, according to example embodiments. Referring to FIG. 1A, the configuration 100 includes a client 110 managing transaction delegation to peers including but not limited to the orderers, committers and endorsers. In operation, a client node 110 sends endorsement requests 105 to an orderer node (111, 113, 115) which operate as part of a priority enforcement module 112 instead of one or more endorsing peers. The endorsement requests and responses are stored in blocks created by the multi-queue block generator 116, and peers perform endorsements upon receiving the blocks from the orderer node rather than direct requests from clients, and then sends responses to the orderer/ordering node. Monitoring and rebalancing can be performed by each client by monitoring the relative processing speeds of the peers, which include comparing block heights of endorsement requests and responses for each transaction. As a result, the selecting of peers may be performed by sending endorsement requests to those identified peers in an order of descending processing speeds identified for those peers.

When a client node or entity proposes/sends a new blockchain transaction request 101 to a set of "endorser" peers. A priority calculator 124 may be used by each peer, and those endorser peers (121, 123, 125) assign a priority to the transaction and embed the transaction with an endorsement response message 103. Endorsers can decide priority statically based on an implemented policy or the endorsers can decide priority dynamically based on local knowledge (e.g., a current transaction load size). Each endorser can assign the same or different priorities to a transaction in its response endorsement message. In one example, if there are four endorsers provided with access to the transaction, each can assign the transaction a different priority or three may assign it the same priority or all may assign the same priority, etc. The initial assignment of policies by the endorsers may be considered a soft priority enforcement by each peer to decide when the transaction is executed 120.

Some examples of criteria that an endorser can use to determine priority may include a chaincode-ID, a particular function invoked, a write transaction having priority over a read transaction (e.g., queries with an empty write set written to the transaction log for audit purposes), and/or a currently experienced network load of transactions pending. The peer endorsers can utilize a priority calculated locally to execute transactions with higher priority first, such as a soft enforcement of priority. The client receives all the endorsements and priority assignments and checks the results for integrity. The client may bundle the priorities and forward all the information with a transaction to an "orderer" peer/consensus provider.

The priority consolidator 114 at the orderer and endorsers entities decides the final priority using a priority consolidation policy 140. This final priority is determined by endorsers using the $2^{nd}$ round of endorsements. Orderers enforce prioritization during block formation and maintain separate queues 118 for each priority and send the transactions to the respective queues 118 based on the final priority assignment procedure. The orderer peer reads the transactions from different priority queues based on a priority-aware block formation policy that describes how many transactions from each priority-level to include in a block. The multi-queue block generator 116 forms the block(s). All orderers should select the same set of transactions from different priority queues to form a block. To support this process, time to cut (TTC) synchronization messages are used in this multi-queue configuration. Transactions may include write transactions 107 and read transactions 109. Blocks are delivered 111 to the validator 134 for priority enforcement 130. The validators/committer nodes (131, 133, 135) leverage the policy assigned to each transaction to enforce priority during validation ordering and execution via the prioritized validator 134, which selects higher priority transactions over lower priority transactions, when there is a conflict within a block, which is a form of parallel validation of transactions. Ultimately, the transactions are committed to the ledger 136 once preliminary priorities are assigned by endorsers and final priorities are selected by the orderers.

When deciding the priority to assign to a particular transaction, a first approach may be a static approach to deciding the priority based on various parameters, such as a chaincode-ID, whether it is a read/write set and/or a client-ID. The policy to decide the priority can be specified via a configuration file which is retrieved and used to justify the policy decision. The priority may also be decided dynamically, where each peer decides priority on the basis of a number of transactions per client ID, a system load at a given peer, transactions received from unrecognized/preferred clients. The endorser may decide the priority to assign to the transaction and send it as part of a proposal response to the client's request for endorsement, which then forwards the transaction to the ordering service for final priority and commitment operations. The endorser may provide a signature when establishing a priority.

One example of a static priority assignment may provide identifying certain transactions as: transaction 'A': #Reads 10, #Writes 2, transaction B: #Read 2, #Writes 10. The result would be transaction A being assigned a priority '3', and transaction B a priority '1' based on the number of read and writes in each of the transactions. The writes are more important than the reads to the priority scheme policy. Next, the orderer receives different and/or same endorsed priorities for the transaction and must decides a final priority. In another example embodiment, priority consolidation can also be performed at the endorsers using the 2nd round of endorsements for finalization of priorities, where a client bundles the priorities received from endorsers and sends them back to each endorser for final priority calculation. In one specific priority example, suppose the endorser set is: E={A, B, C, D}, some example policies can be majority (n/2+) out of 'n'. Priority would be considered in an order, such as A>B>C>D, if A is endorsed, its priority will be considered, if not, then B's priority will be considered, and so on. With certain weights (A=40, B=30, C=20, D=10), an average SUM(All)/n.

According to example embodiments, there are N-queues corresponding to N priority levels. When publishing to a queue, the orderer reads the priority value from the transactions received and publishes the transactions to the appropriate priority queues based on a majority of priorities assigned, a median priority, or other priority segregation operations. The orderer reads the queues and forms blocks. A number of transactions of each priority to be included in a block may be defined in a policy. The orderer forms blocks based on percentages, batchsize and/or a timeout. The orderer first tries to form the block by including the expected number of transactions for each priority. In case there is a timeout before reaching the expected number of transactions, a time-to-cut block number 'n' (TTC−n*) message is sent to all the queues. The block first includes an expected number of transactions, and transactions available before TTC from each topic. The remaining transactions are taken from the topic with a highest priority with remaining transactions before TTC-n.

When enforcing the priority, one example may provide, for example, if the percentages are <100, 0, 0> for 3 priorities <high, medium, low>, and the batchsize to form a block is 100, then the orderer should form the block as soon as it observes 100 transactions from a high priority queue. In case that there is a timeout before the 100 high priority transactions are seen, the orderer sends a TTC-n message to all the queues. Before the TTC-n message, there were 60 transactions in a high priority queue, 20 in a medium priority queue and 50 in a low priority queue. Now, the block includes 60 transactions from a high priority queue, 20 from a medium priority and 20 from a low priority queue. In this example, all high priority queue transactions were taken for the block along with an equal number of medium and low priority transactions.

In another example of block management, the percentage tuple may be <50, 30, 20>. If the orderer observes at least 50 transactions in a high priority queue, 30 in a medium priority queue and 20 in a low priority queue, it forms the block right away. In the case where any of the buckets are not full at the timeout, a TTC-n message is sent to all the queues. Assuming that, before TTC-n, there were 55 transactions in a high priority queue, 50 in a medium priority queue and 10 in a low priority queue, now the formed block will include 55 transactions from the high priority queue, 35 from the medium priority queue and 10 from the low priority queue.

Priorities alternatively could be decided by the client or at the final stage of transaction (committer). The client can also propose priorities for the transactions that it identifies as being lesser or more important. With the assumption that orderers can be malicious and there exists a way to recover from a diverged ledger, a priority verification can also be performed at the orderers where a final priority calculation can be verified independently at each orderer and a check may be performed to determine whether a final priority of a transaction matches a queue that is was read from originally. On identifying any non-compliance issue, the transaction can be dropped. Some fundamental assumptions about this configuration include a multi-peer distributed blockchain system, where a peer can have one or many roles (e.g., endorsers, committer, orderer), a distributed queue that provides "total order" and all consumers consume the same set of messages.

The possible criteria which can be used by the endorser while deciding the initial priority may be based on various different criteria. For example, with regard to the chaincode, the transactions related to a particular chaincode (smart contract) might have a higher priority than the transactions related to some other chaincode. For example, system configuration update transactions, which are executed by the system chaincode, might be assigned a higher priority by the endorser than transactions related to any other chaincode. In another example with regard to the function within a chaincode, there are multiple functions and a transaction calling a particular function might be assigned a higher priority than a transaction calling other functions in the same chaincode. For example, if there is a chaincode for hospital management, and inside that chaincode there are two functions "admitPatientToEmergency" and "dischargePatient". As a result, the transaction related to a "admitPatientToEmergency" function may be assigned a higher priority over transactions related to a "dischargePatient" function. With regard to transactions over reads/queries with an empty write set, in this case, the endorser might be configured to provide transactions which have to perform system updates 'writes' on certain variables, a higher priority over the transactions which have to simply 'read' variables. A reverse policy could also be used where the read transactions are assigned a higher priority than the write transactions. With regard to a current experience load example, here an endorser might be configured in such a way that if it knows that it has not seen any transaction with a priority #1 (i.e., highest priority) in some time, than even the transactions with a second priority #2 (lower priority than priority #1) can be moved to a priority #1 level, under those circumstances. Also, an endorser might be configured to decide the priority by using a combination of more than one of those policies.

In general, there are two main types of policies being considered according to the example embodiments, which include a priority policy and a priority consolidation policy. The priority policy is the type of policy outlined in the example policy considerations. If, for example, the priority policy was to decide the priority only based on the chaincode ID, then the policy document will state: "chaincode1"→Priority1; "chaincode2"→Priority1; "chaincode3"→Priority2 and so on. The other policy is the priority consolidation policy.

The orderer determines a final priority using the priority consolidation policy. Both the priority policy and the priority consolidation policy are stored in two separate files. Those files are the policy files. The first policy file is used by the endorser to determine the initial priority assignment and the second policy file is used by the orderer to decide the final priority. The endorser set is: E={A, B, C, D}, some example policies can be a majority (n/2+) out of 'n'. Priority would be considered in an order, such as A>B>C>D, if A is endorsed, its priority will be considered, if not, then B's priority will be considered, and so on. With certain weights (A=40, B=30, C=20, D=10), an average is SUM(All)/n. In the above mentioned examples, there are four endorsers A, B, C and D. So, the set of endorsers denoted by 'E' has 4 elements. Therefore E={A, B, C, D}. Now, the sample priority consolidation policies can be: sample policy 1: majority (n/2+) out of 'n', so there are four endorsers, in this example n=4 and if 2 (n/2) or more than 2 endorsers agree on some priority, than that is the final priority. For sample policy 2, a priority would be considered in an order, such as A>B>C>D. Note that a client can select to not take endorsement from one or more endorsers in the set E. In that case, if this type of priority consolidation policy was specified, and the client takes the endorsement from endorser 'A', then whatever priority was assigned by 'A' is considered as the final priority. Similarly, if endorsement from endorser 'A' is missing, and if the endorsement from 'B' is taken, then the priority assigned by endorser 'B' is considered the final priority and so on. In another sample policy 3, with certain weights (A=40, B=30, C=20, D=10), in this kind of policy each endorser has been assigned some weightage, so if endorser 'A' indicated that the priority should be #1, but B, C and D vote that the priority should be #2, because, as measured against priority #1 there were 40 weights (from endorser A) but against priority #2 there were 60 weights (from endorsers B, C and D). In another example, sample policy #4 has an average sum(all)/n. This is a simple average based policy, so if 'A' indicates priority #2, and 'B' indicates priority #2, and C indicates priority #3, and D indicates priority #1, then the final priority will be (2+2+3+1)/4=2, which is the average.

The system configuration of policy management can be configured to include a certain number of transactions of each priority in a block. So, for example, if the block size is 100 transactions and there are three priority levels, then there we will include 50 transactions of priority #1, 30 transactions of priority #2 and 20 transactions of priority #3 in a block. Now, this ratio is 50:30:20, which can be defined as a configuration. Ideally, at least one transaction from each queue would be included in a single block so as not to disregard any of the blockchain members. If, for a certain period of time, it is desirable to stop transactions of some particular priority level than the transaction operational ratio can be specified accordingly. For example, if in the above mentioned example, the ratio is 50:50:0, then the transactions with priority #3 will not be included in any block. So, until and unless this ratio is updated after some time, the transactions with priority #3 will not be processed at all, assuming there are 50 transactions each of a priority #1 and #2 available to fill each block. In other words, priority #3 will be strictly a best effort scenario based on any remaining capacity after accommodating transactions of priority #1 and #2.

Figure 1B:
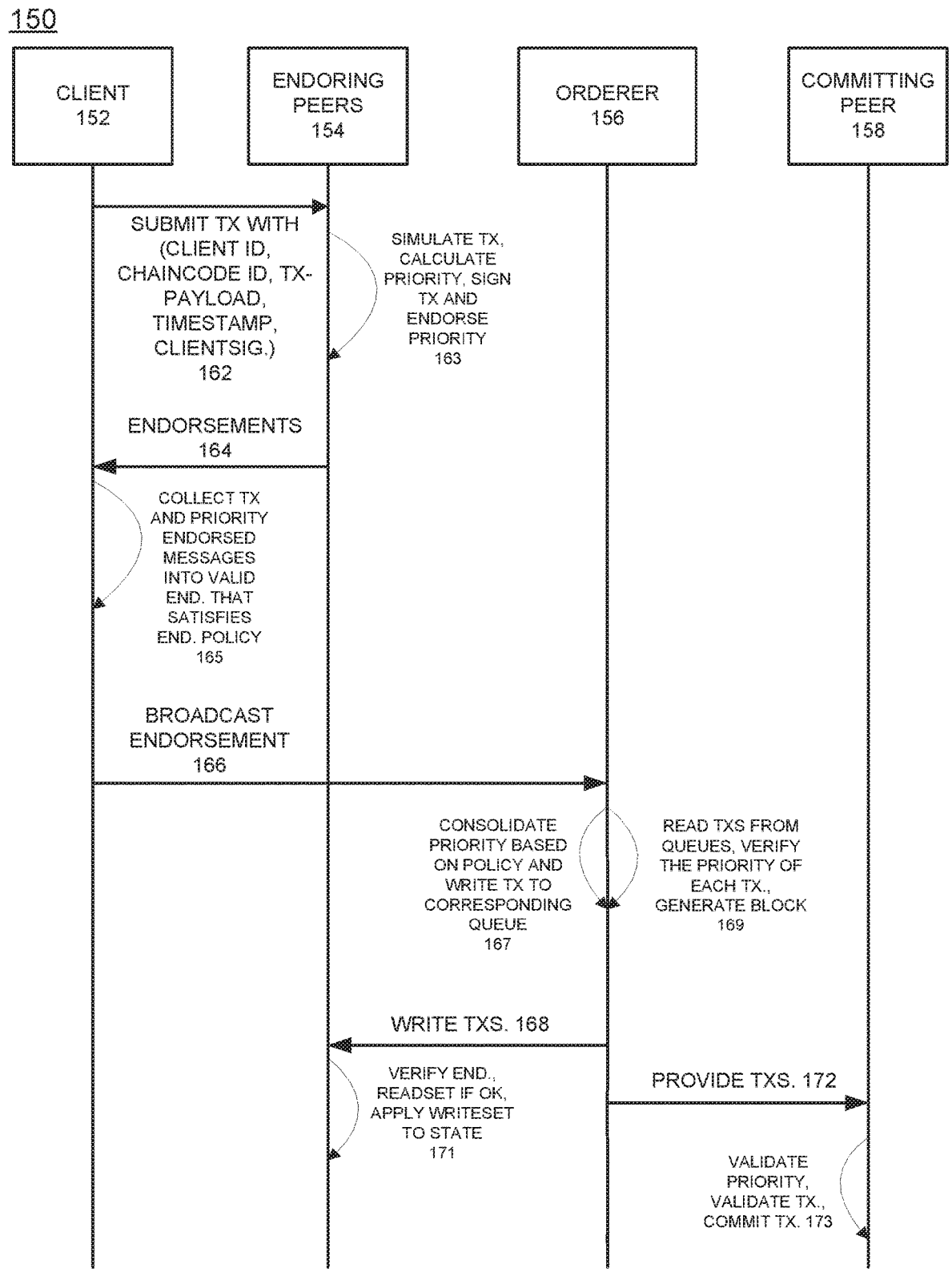
FIG. 1B illustrates a system configuration diagram of a set of operations performed during blockchain transaction priority assignment, according to example embodiments.

FIG. 1B illustrates a system configuration diagram of a set of operations performed during blockchain transaction priority assignment, according to example embodiments. Referring to FIG. 1B, the system configuration 150 includes include a client 152, endorsing peers 154, an orderer 156 and a committing peer 158. Initially, the client 152 submits transactions for priority assignment to the endorsing peers 154. The transaction requests may include a client ID, chaincode ID, the transaction payload, a timestamp and a client signature 162. The endorsing peers 154 may simulate the transactions and calculate a priority based on the known data, and sign the priority assignments 163. The endorsements 164 are sent back to the client 152, which collects the transactions and priority information 165, and sends the endorsements 166 to the orderer 156. The priority assignments are consolidated based on the policy and are assigned to the corresponding queues 167. The transactions are read from the queues, and the priority of each transaction is verified prior to generating the block of transactions 169. The block is assigned to the endorsing peers along with the write transactions 168. The peers verify the endorsements and readsets and if acceptable, the writeset is applied to the state 171. The transactions are then submitted to the committing peer 172, which validates the priority and validates the transactions for committal to the blockchain 173.

Figure 2A:
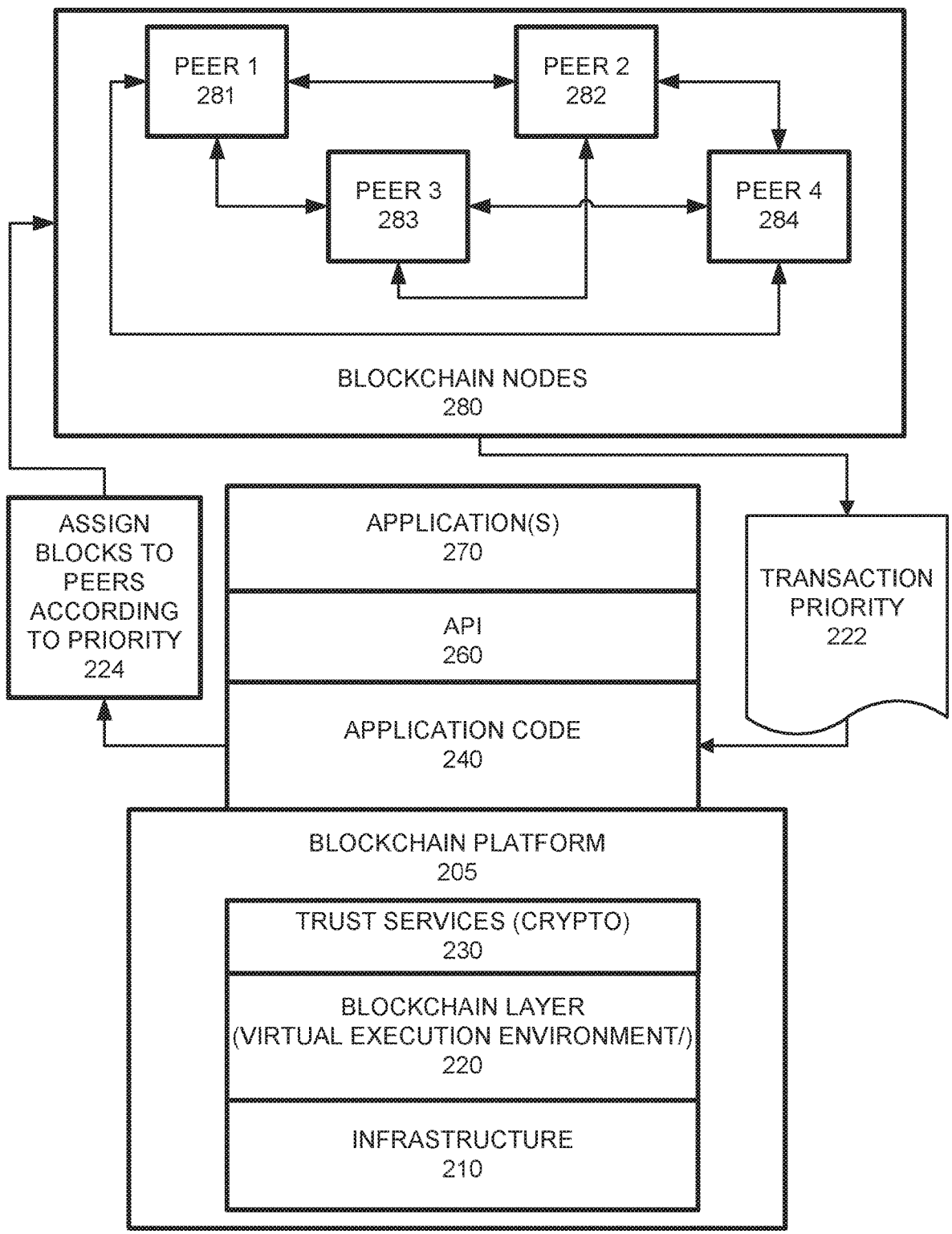
FIG. 2A illustrates an example peer node blockchain architecture configuration for a transaction priority assignment scenario, according to example embodiments.

FIG. 2A illustrates a blockchain system architecture configuration 200, according to example embodiments. Referring to FIG. 2A, blockchain architecture 200 may include certain blockchain elements, for example, a group 280 of blockchain nodes 281-284 which participate in a blockchain transaction addition and validation process (consensus). One or more of the blockchain nodes 281-284 may endorse transactions and one or more blockchain nodes 281-284 may provide an ordering service for all blockchain nodes in the architecture 200. A blockchain node may initiate a blockchain authentication and attempt to write to a blockchain immutable ledger stored in blockchain layer 220, a copy of which may also be stored on the underpinning physical infrastructure 210. The blockchain configuration may include one or more applications 270, which are linked to application programming interfaces (APIs) 260 to access and execute stored program/application code 250 (e.g., chaincode, smart contracts, etc.), which can be created according to a customized configuration sought by participants and can maintain their own state, control their own assets, and receive external information.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 240 via one or more interfaces exposed, and services provided, by blockchain platform 205. The code 240 may control blockchain assets. For example, the code 240 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In one example, peer transaction priority data 222 may be identified and processed by one or more processing entities (e.g., virtual machines) included in the blockchain layer 220. The result may include assigning blocks to the peers according to the priority assignments 224 for processing of blockchain tasks/events.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. In operation, the chaincode may receive a hash and retrieve from the blockchain a hash associated with the data template created by a previously stored feature extractor. If the hashes of the hash identifier and the hash created from the stored identifier template data match, then the chaincode sends an authorization key to the requested service. The chaincode may write to the blockchain data associated with the cryptographic details. In this example of FIG. 2A, the peer priority assignments may be used to order, assign, and write the transactions to the blockchain as transaction blocks.

Figure 2B:
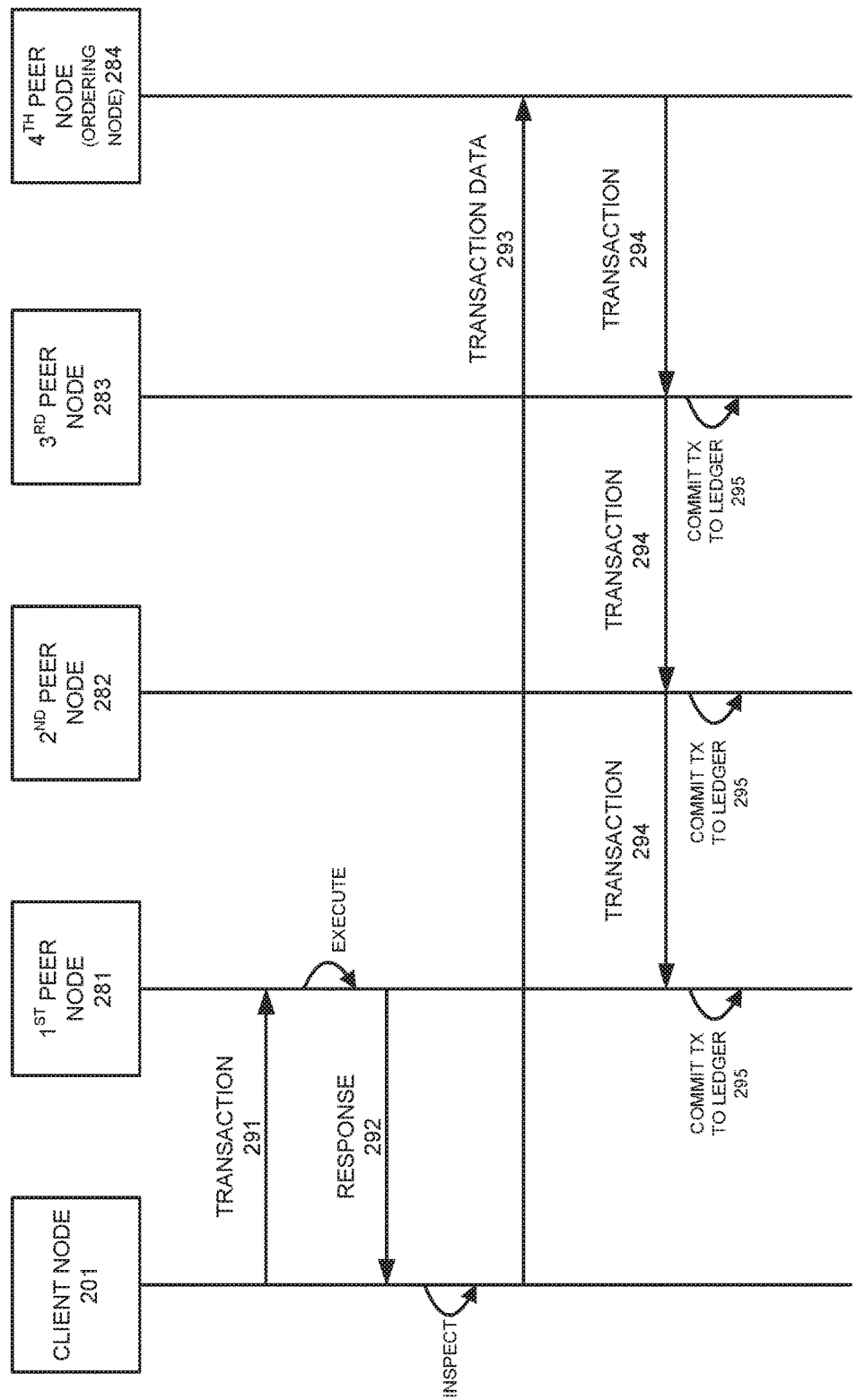
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 201 to an endorsing peer node 281. The endorsing peer 281 may verify the client signature, and execute a chaincode function to simulate the transaction. The output may include the chaincode results, a set of key/value versions that were read in the chaincode (read set), and the set of keys/values that were written in chaincode (write set). The proposal response 292 is sent back to the client 201 along with an endorsement signature, if approved. The client 201 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results, and authenticated the signatures against the transaction payload 293.

Referring again to FIG. 2B, the client node 201 initiates the transaction 291 by constructing and sending a request to the peer node 281, which is an endorser. The client 201 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 201 which parses the payload for the application to consume.

In response, the application of the client 201 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
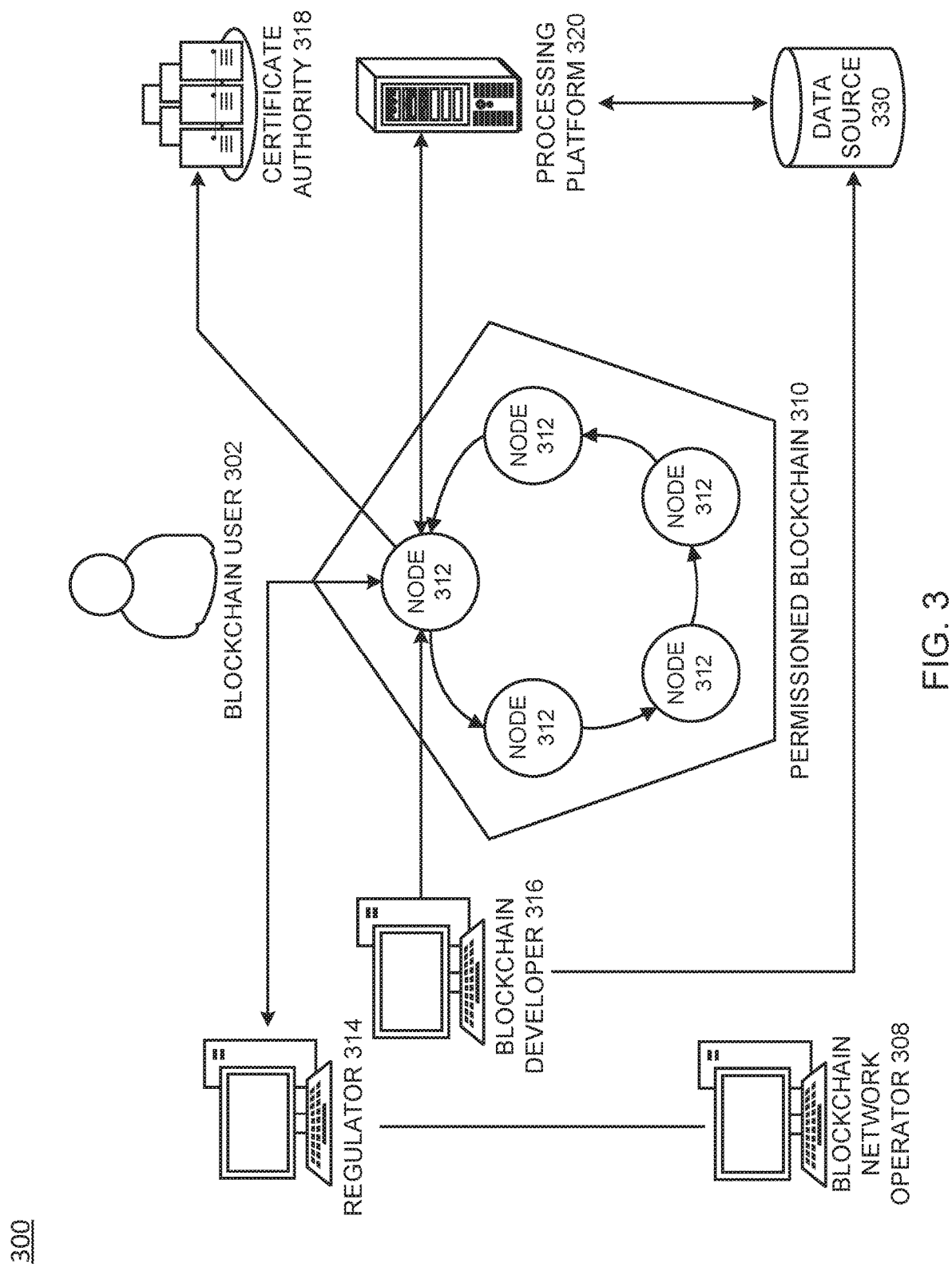
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator 308 manages a system of nodes which includes managing member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
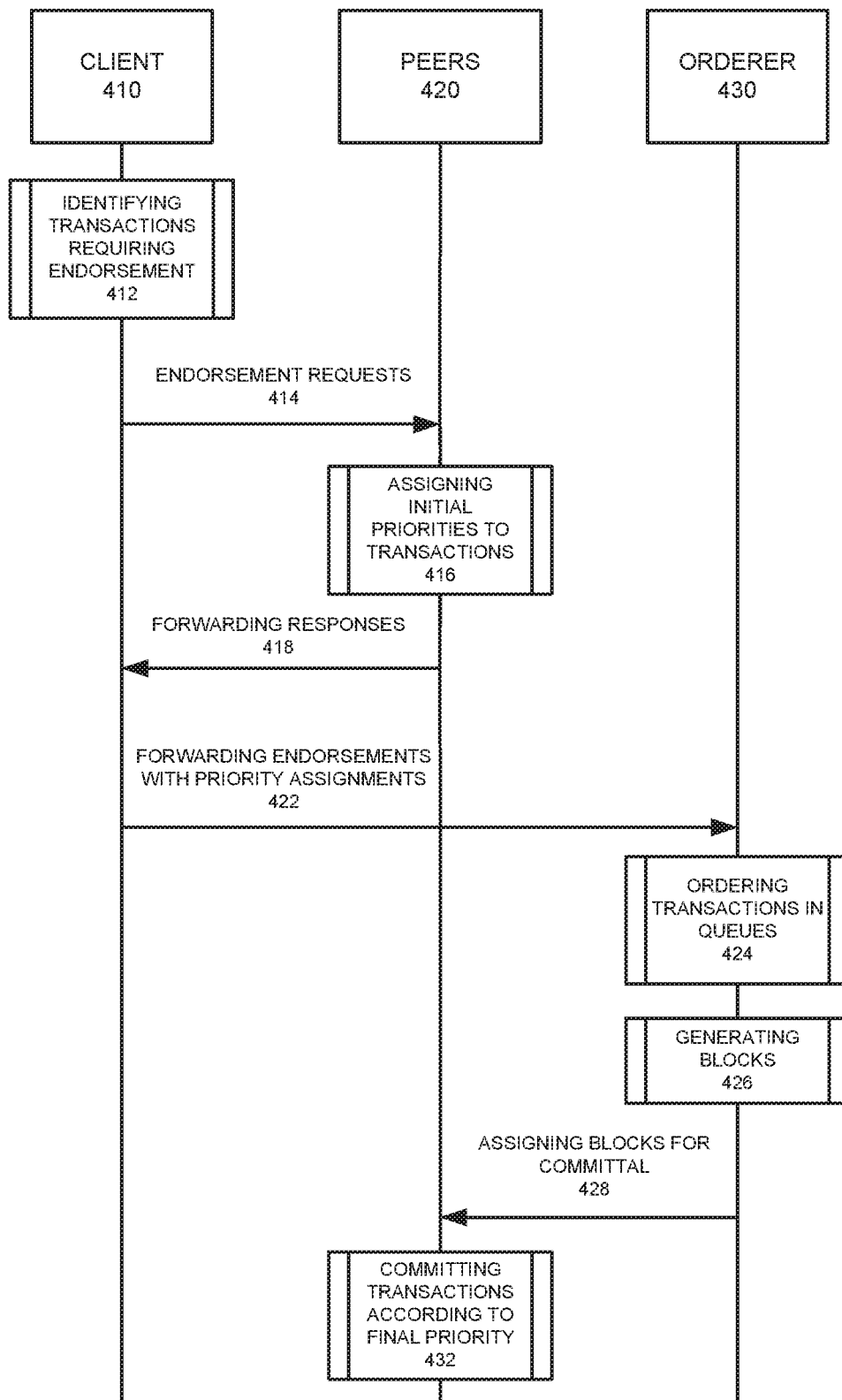
FIG. 4 illustrates a system messaging diagram for performing transaction priority assignment, according to example embodiments.

FIG. 4 illustrates a system messaging diagram for performing transaction priority assignment, according to example embodiments. Referring to FIG. 4, the system 400 provides a client 410, peers 420 and an orderer 430. The process may include identifying one or more blockchain transactions requiring endorsement 412. Corresponding requests may be created and sent 414 to the endorsement peers, which assign an initial or first priority to the blockchain transactions 416. The endorsement responses include the endorser peer signatures and priority assigned to the one or more transactions. The responses 418 are sent back to the client 410, which forwards the endorsements 422 to the orderer 430. The transactions are ordered in queues 424 depending on a final priority assigned to each transaction determined by the orderer 430. Blocks are created 426 for commitment of the transactions and assigned 428 to the committing peers. The transactions are committed based on their final priorities 432 and a priority selection procedure used to select the transactions with higher priorities while considering lesser priority transactions according to the policy.

Figure 5A:
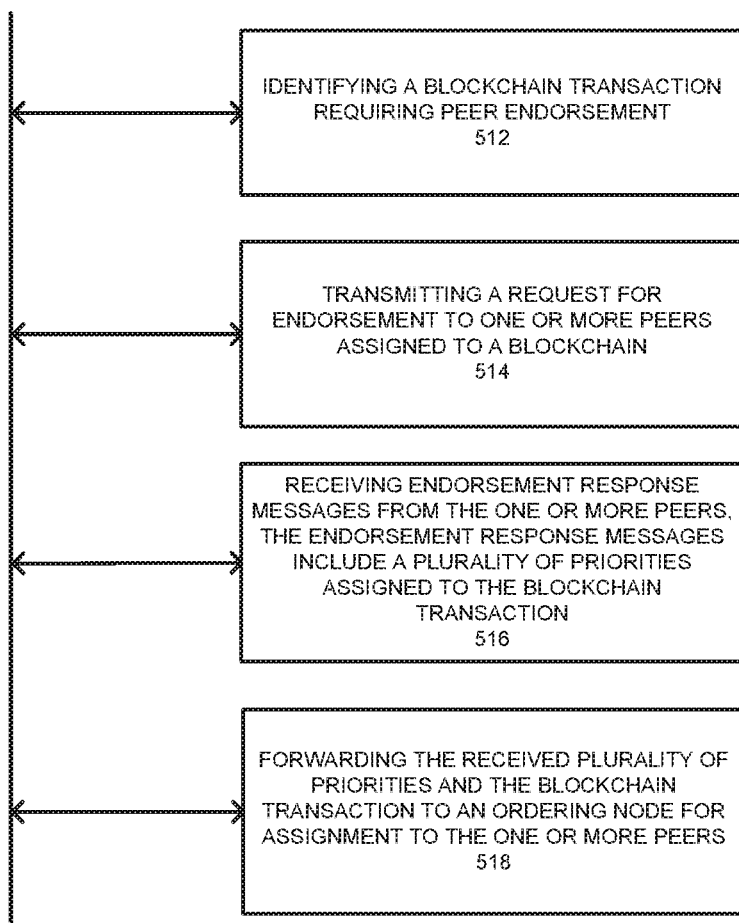
FIG. 5A illustrates a flow diagram of an example method of blockchain transaction priority assignment in a blockchain, according to example embodiments.

FIG. 5A illustrates a flow diagram of an example method of blockchain transaction priority assignment in a blockchain, according to example embodiments. Referring to FIG. 5A, the method 500 may include identifying a blockchain transaction(s) requiring peer endorsement 512, transmitting a request/requests for endorsement to one or more peers assigned to a blockchain 514, receiving endorsement response messages from the one or more peers 516, and where the endorsement response messages include a plurality of priorities assigned to the blockchain transaction. The method also includes forwarding the received plurality of priorities and the blockchain transaction to an ordering node for assignment to the peers 518.

The plurality of priorities assigned to the blockchain transaction include at least one different priority than at least one other of the plurality of priorities. The plurality of priorities assigned to the blockchain transaction may all be a same priority. The criteria used to determine the plurality of priorities assigned to the blockchain transaction include one or more of a chaincode identifier (ID), a function invoked, a transaction type and a current load of blockchain transactions. The method also provide determining a final ordering priority of the blockchain transaction at the ordering node based on the received plurality of priorities, and assigning the blockchain transaction to one of a plurality of priority queues based on those final priorities. The method may also include selecting a plurality of blockchain transactions assigned a higher priority than other blockchain transactions from the plurality of priority queues, when one or more transaction conflicts are identified, and validating the plurality of blockchain transactions assigned the higher priority to form a blockchain block. In general, the plurality of blockchain transactions assigned the higher priority are validated first based on an endorsement policy.

Figure 5B:
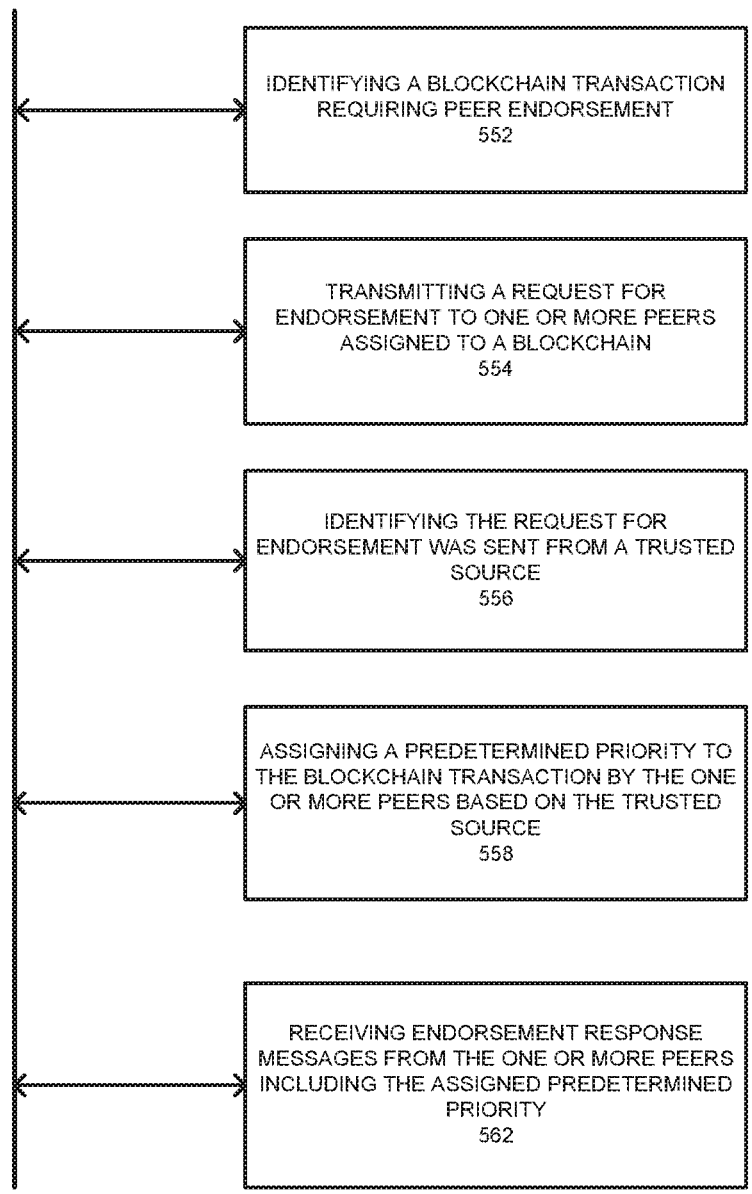
FIG. 5B illustrates a flow diagram of another example method of blockchain transaction priority assignment in a blockchain, according to example embodiments.

FIG. 5B illustrates a flow diagram of another example method of blockchain transaction priority assignment in a blockchain, according to example embodiments. Referring to FIG. 5B, the method 550 includes identifying a blockchain transaction requiring peer endorsement 552, transmitting a request for endorsement to one or more peers assigned to a blockchain 554, identifying the request for endorsement was sent from a trusted source 556, assigning a predetermined priority to the blockchain transaction by the one or more peers based on the trust source 558, and receiving endorsement response messages from the one or more peers comprising the assigned predetermined priority 562.

In addition to the priority determination procedure performed by the peers according to the policies and the known attributes of the endorsement requests, a trusted source may only forward endorsement requests which are known to be of a certain priority. This enables the peers to override any determination process and assign a certain priority directly without any other priority calculations or determination processes.

Figure 6A:
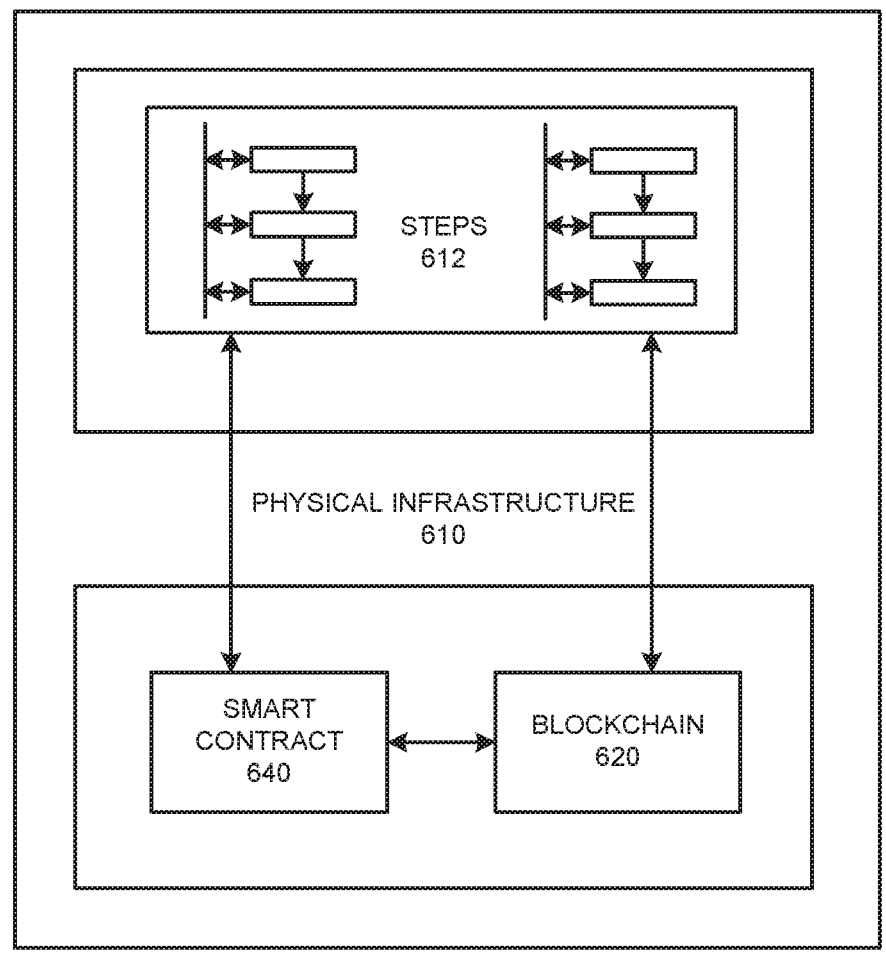
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
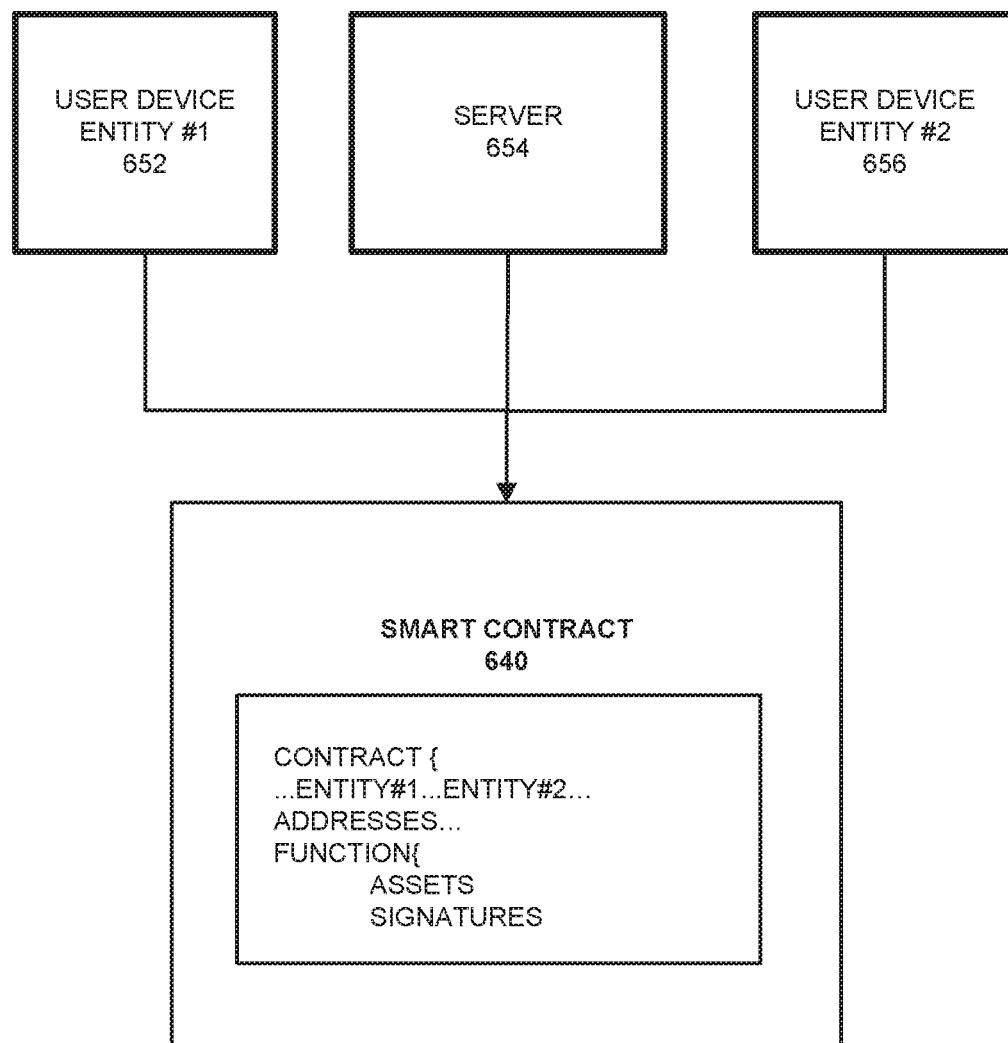
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
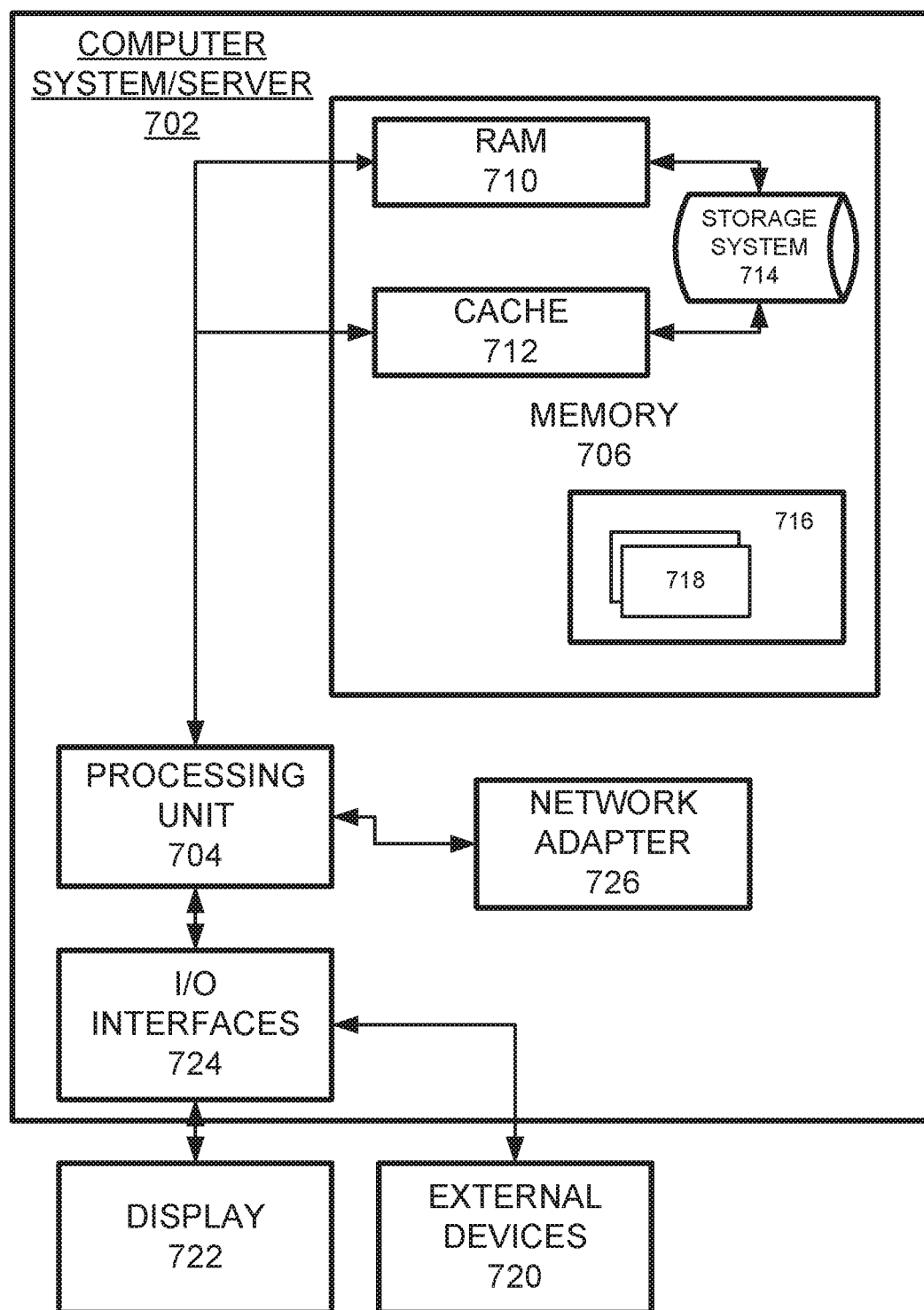
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying a blockchain transaction requiring peer endorsement;
   transmitting a request for endorsement to one or more peers assigned to a blockchain;
   receiving endorsement response messages from the one or more peers, wherein the endorsement response messages comprise a plurality of priorities assigned to the blockchain transaction; and
   forwarding the received plurality of priorities and the blockchain transaction to an ordering node for assignment to the peers.

2. The method of claim 1, wherein the plurality of priorities assigned to the blockchain transaction comprise at least one different priority than at least one other of the plurality of priorities.

3. The method of claim 1, wherein the plurality of priorities assigned to the blockchain transaction are all a same priority.

4. The method of claim 1, wherein criteria used to determine the plurality of priorities assigned to the blockchain transaction comprise one or more of a chaincode identifier (ID), a function invoked, a transaction type and a current load of blockchain transactions.

5. The method of claim 1, further comprising:
   determining a final ordering priority of the blockchain transaction at the ordering node based on the received plurality of priorities; and
   assigning the blockchain transaction to one of a plurality of priority queues.

6. The method of claim 5, further comprising:
   selecting a plurality of blockchain transactions assigned a higher priority than other blockchain transactions from the plurality of priority queues, when one or more transaction conflicts are identified; and
   validating the plurality of blockchain transactions assigned the higher priority to form a blockchain block.

7. The method of claim 6, wherein the plurality of blockchain transactions assigned the higher priority are validated based on an endorsement policy.

8. An apparatus, comprising:
   a processor configured to identify a blockchain transaction that requires peer endorsement;
   a transmitter configured to transmit a request for endorsement to one or more peers assigned to a blockchain;
   a receiver configured to receive endorsement response messages from the one or more peers, wherein the endorsement response messages comprise a plurality of priorities assigned to the blockchain transaction; and wherein the transmitter is further configured to forward the received plurality of priorities and the blockchain transaction to an ordering node for assignment to the peers.

9. The apparatus of claim 8, wherein the plurality of priorities assigned to the blockchain transaction comprise at least one different priority than at least one other of the plurality of priorities.

10. The apparatus of claim 8, wherein the plurality of priorities assigned to the blockchain transaction are all a same priority.

11. The apparatus of claim 8, wherein criteria used to determine the plurality of priorities assigned to the blockchain transaction comprise one or more of a chaincode identifier (ID), a function invoked, a transaction type and a current load of blockchain transactions.

12. The apparatus of claim 8, wherein the processor is further configured to:
  determine a final ordering priority of the blockchain transaction at the ordering node based on the received plurality of priorities; and
  assign the blockchain transaction to one of a plurality of priority queues.

13. The apparatus of claim 12, wherein the processor is further configured to
  select a plurality of blockchain transactions assigned a higher priority than other blockchain transactions from the plurality of priority queues, when one or more transaction conflicts are identified; and
  validate the plurality of blockchain transactions assigned the higher priority to form a blockchain block.

14. The apparatus of claim 13, wherein the plurality of blockchain transactions assigned the higher priority are validated based on an endorsement policy.

15. A non-transitory computer readable storage medium configured to store instructions that when executed cause a processor to perform:
  identifying a blockchain transaction requiring peer endorsement;
  transmitting a request for endorsement to one or more peers assigned to a blockchain;
  receiving endorsement response messages from the one or more peers, wherein the endorsement response messages comprise a plurality of priorities assigned to the blockchain transaction; and
  forwarding the received plurality of priorities and the blockchain transaction to an ordering node for assignment to the peers.

16. The non-transitory computer readable storage medium of claim 15, wherein the plurality of priorities assigned to the blockchain transaction comprise at least one different priority than at least one other of the plurality of priorities.

17. The non-transitory computer readable storage medium of claim 15, wherein the plurality of priorities assigned to the blockchain transaction are all a same priority.

18. The non-transitory computer readable storage medium of claim 15, wherein criteria used to determine the plurality of priorities assigned to the blockchain transaction comprise one or more of a chaincode identifier (ID), a function invoked, a transaction type and a current load of blockchain transactions.

19. The non-transitory computer readable storage medium of claim 15, wherein the processor is further configured to perform:
  determining a final ordering priority of the blockchain transaction at the ordering node based on the received plurality of priorities; and
  assigning the blockchain transaction to one of a plurality of priority queues.

20. The non-transitory computer readable storage medium of claim 19, wherein the processor is further configured to perform:
  selecting a plurality of blockchain transactions assigned a higher priority than other blockchain transactions from the plurality of priority queues, when one or more transaction conflicts are identified; and
  validating the plurality of blockchain transactions assigned the higher priority to form a blockchain block, and wherein the plurality of blockchain transactions assigned the higher priority are validated based on an endorsement policy.

* * * * *